(12) United States Patent
Tamaki (10) Patent No.: US 10,749,178 B2
(45) Date of Patent: Aug. 18, 2020

(54) COMPOSITE ACTIVE MATERIAL FOR LITHIUM SECONDARY BATTERIES AND METHOD FOR PRODUCING SAME

(71) Applicant: TOSOH CORPORATION, Shunan-shi, Yamaguchi (JP)

(72) Inventor: Ryo Tamaki, Kyoto (JP)

(73) Assignee: TOSOH CORPORATION, Shunan-shi, Yamaguchi (JP)

( * ) Notice: Subject to any disclaimer, the term of this patent is extended or adjusted under 35 U.S.C. 154(b) by 0 days.

(21) Appl. No.: 14/911,826

(22) PCT Filed: Aug. 12, 2014

(86) PCT No.: PCT/JP2014/071308
§ 371 (c)(1),
(2) Date: Feb. 12, 2016

(87) PCT Pub. No.: WO2015/022964
PCT Pub. Date: Feb. 19, 2015

(65) Prior Publication Data
US 2016/0197345 A1 Jul. 7, 2016

(30) Foreign Application Priority Data
Aug. 14, 2013 (JP) ................................. 2013-168719

(51) Int. Cl.
*H01M 4/587* (2010.01)
*H01M 4/04* (2006.01)
(Continued)

(52) U.S. Cl.
CPC ......... *H01M 4/587* (2013.01); *H01M 4/0471* (2013.01); *H01M 4/13* (2013.01);
(Continued)

(58) Field of Classification Search
CPC ...... H01M 4/587; H01M 4/0471; H01M 4/13; H01M 4/485; H01M 20/0525;
(Continued)

(56) References Cited

U.S. PATENT DOCUMENTS

| | | | |
|---|---|---|---|
| 2003/0215711 A1 | 11/2003 | Aramata et al. | |
| 2006/0068287 A1* | 3/2006 | Morita | H01M 4/134 429/223 |

(Continued)

FOREIGN PATENT DOCUMENTS

| | | |
|---|---|---|
| CN | 1228882 C | 11/2005 |
| JP | 2004-119176 A | 4/2004 |

(Continued)

OTHER PUBLICATIONS

Translation of Communication dated Jun. 6, 2017, from the Japanese Patent Office in counterpart Japanese application No. 2013-168719.

(Continued)

*Primary Examiner* — Stewart A Fraser
(74) *Attorney, Agent, or Firm* — Sughrue Mion, PLLC (57) ABSTRACT

Provided is a production method for a composite active material for lithium secondary batteries which enables production of an electrode material in which volume expansion is suppressed even after repeated charging and discharging, and enables production of a lithium secondary battery exhibiting excellent cycle characteristics. A composite active material for lithium secondary batteries is produced using a mixing step of mixing graphite having a specific surface area of not less than 30 m²/g, silicon monoxide, and a carbon precursor to obtain a mixture; a conglobation step of performing conglobation treatment on the mixture and obtaining a spherical mixture; and a heating step of heat-treating (Continued)

the spherical mixture and producing a substantially spherical composite active material for lithium secondary batteries.

8 Claims, 1 Drawing Sheet (51) Int. Cl.
- H01M 4/38 (2006.01)
- H01M 4/13 (2010.01)
- H01M 4/48 (2010.01)
- H01M 4/36 (2006.01)
- H01M 4/485 (2010.01)
- H01M 10/0525 (2010.01)
- H01M 4/02 (2006.01)

(52) U.S. Cl.
CPC .......... H01M 4/362 (2013.01); H01M 4/364 (2013.01); H01M 4/366 (2013.01); H01M 4/386 (2013.01); H01M 4/483 (2013.01); H01M 4/485 (2013.01); H01M 10/0525 (2013.01); H01M 2004/027 (2013.01)

(58) Field of Classification Search
CPC .......... H01M 2004/027; H01M 4/362; H01M 4/364; H01M 4/366; H01M 4/386; H01M 4/483
See application file for complete search history.

(56) References Cited

U.S. PATENT DOCUMENTS

| | | | |
|---|---|---|---|
| 2009/0029256 A1 | 1/2009 | Mah et al. | |
| 2010/0176337 A1* | 7/2010 | Zhamu | H01M 4/1391 252/182.1 |
| 2011/0111303 A1 | 5/2011 | Kung et al. | |
| 2012/0064409 A1* | 3/2012 | Zhamu | B82Y 30/00 429/221 |
| 2013/0078490 A1 | 3/2013 | Morita et al. | |
| 2013/0302675 A1* | 11/2013 | Kouzu | H01M 4/364 429/211 |
| 2014/0166929 A1 | 6/2014 | Takeuchi et al. | |
| 2014/0227600 A1 | 8/2014 | Kachi | |

FOREIGN PATENT DOCUMENTS

| | | |
|---|---|---|
| JP | 2005-123175 A | 5/2005 |
| JP | 2007-59213 A | 3/2007 |
| JP | 2008-186732 A | 8/2008 |
| JP | 2009-259723 A | 11/2009 |
| JP | 2012-124115 A | 6/2012 |
| JP | 2013-30428 A | 2/2013 |
| JP | 2013-073764 A | 4/2013 |
| JP | 5227483 B2 | 7/2013 |
| JP | 2013-219018 A | 10/2013 |
| KR | 1020050090218 A | 9/2005 |
| WO | 2013/027686 A1 | 5/1917 |
| WO | 2012/077785 A1 | 6/2012 |
| WO | 2014/129594 A1 | 8/2014 |

OTHER PUBLICATIONS

International Search Report for PCT/JP2014/071308 dated Oct. 7, 2014.
Communication dated Dec. 16, 2016, from the European Patent Office in counterpart European application No. 14836628.9.
Morita, et al., "Nano Si Cluster-$SiO_x$- C Composite Material as High-Capacity Anode Material for Rechargeable Lithium Batteries", Journal of the Electrochemical Society, vol. 153, No. 2, Jan. 6, 2006, pp. A425-A430 (6 pages), XP002636352.
Communication dated May 15, 2017, issued by the States Intellectual Property Office of People's Republic of China in counterpart Chinese Application No. 201480045075.X.
Communication dated Oct. 23, 2017, issued by the States Intellectual Property Office of People's Republic of China in counterpart Chinese Application No. 201480045075.X.
Communication dated Nov. 24, 2017, issued by the Japanese Patent Office in counterpart Japanese Application No. 2013-168719.
Communication dated Apr. 27, 2018, from State Intellectual Property Office of the P.R.C in counterpart application No. 201480045075. X.

* cited by examiner

COMPOSITE ACTIVE MATERIAL FOR LITHIUM SECONDARY BATTERIES AND METHOD FOR PRODUCING SAME

CROSS REFERENCE TO RELATED APPLICATIONS

This application is a National Stage of International Application No. PCT/JP2014/071308 filed Aug. 12, 2014, claiming priority based on Japanese Patent Application No. 2013-168719 filed Aug. 14, 2013, the contents of all of which are incorporated herein by reference in their entirety.

TECHNICAL FIELD

The present invention relates to a composite active material for lithium secondary batteries and a production method therefor.

BACKGROUND ART

As electronic materials decrease in size and weight and with the development of HEV and EV, the need for development of batteries having large capacity, high-speed charging and discharging characteristics, good cycle characteristics, and excellent safety is increasing. Above all, lithium ion secondary batteries (lithium secondary batteries) have received attention as the most promising type of battery.

However, an assumption in developing lithium secondary batteries exhibiting excellent performance is that anode materials, cathode materials, electrolytes, separators, current collectors, and the like having excellent performance will be developed, and battery design that makes full use of these characteristics is necessary.

Above all, since the anode material determines basic battery characteristics, anode materials with better characteristics such as charging and discharging characteristics are being actively developed.

For example, Patent Document 1 discloses a composite active material for lithium secondary batteries capable of producing a lithium secondary battery having a large charging and discharging capacity, high-speed charging and discharging characteristics, and good cycle characteristics, as well as a production method therefor.

CITATION LIST

Patent Literature

Patent Literature 1: Japanese Patent No. 5227483B

SUMMARY OF INVENTION

Technical Problem

From the viewpoint of usage safety of batteries, it has recently come to be demanded that electrode materials not expand in volume even after repeated charging and discharging. If volume expansion of the electrode materials is large, leakage of the electrolyte occurs, causing a drop in battery life. Furthermore, energy density per unit volume decreases and the advantages of using a high-capacity material are lost.

When the present inventors produced a composite active material for lithium secondary batteries containing silicon as a battery active material capable of combining with lithium ions according to the production method described in the aforementioned Patent Document 1 and evaluated the obtained composite active material for lithium secondary batteries with regard to expansion characteristics of the electrode materials (for example, the anode material), after several cycles they saw irreversible volume expansion approximately three times greater than the theoretical expansion that accompanies alloying of lithium and silicon, and found that further improvement was required. This irreversible abnormal expansion is undesirable because not only does it damage the battery structure, it is also leads to a decrease in volumetric energy density.

In light of the above facts, an object of the present invention is to provide a composite active material for lithium secondary batteries capable of producing an electrode material in which volume expansion is suppressed even after repeated charging and discharging, and capable of producing a lithium secondary battery exhibiting excellent cycle characteristics, as well as a production method therefor.

Another object of the present invention is to provide a battery that uses this composite active material for lithium secondary batteries.

Solution to Problem

As a result of a diligent examination of conventional art, the present inventors discovered that a composite active material for lithium secondary batteries exhibiting the desired characteristics is obtained by using silicon monoxide and a carbon precursor as the raw materials of production of a composite active material for lithium secondary batteries.

Specifically, the present invention resides in the following items (1) to (8).

(1) A composite active material for lithium secondary batteries comprising a composite containing silicon and silicon dioxide, and a graphite component, an area ratio of the graphite component exposed on a surface observed by scanning electron microscope (SEM) at acceleration voltage of not greater than 10 kV being not less than 95%.

(2) The composite active material for lithium secondary batteries according to (1), wherein an average particle size of the silicon is from 1 to 100 nm.

(3) The composite active material for lithium secondary batteries according to (1) or (2), wherein an average particle size of the composite is from 50 to 1000 nm.

(4) A production method for the composite active material for lithium secondary batteries described in (1), comprising:
a mixing step of mixing graphite having a specific surface area of not less than 30 m$^2$/g, silicon monoxide, and a carbon precursor to obtain a mixture;
a conglobation step of performing conglobation treatment on the mixture and obtaining a spherical mixture; and
a heating step of heat-treating the spherical mixture and producing a substantially spherical composite active material for lithium secondary batteries.

(5) The production method for a composite active material for lithium secondary batteries according to (4), wherein an average particle size of the silicon monoxide is not greater than 1 μm.

(6) The production method for a composite active material for lithium secondary batteries according to (4) or (5), wherein the carbon precursor is at least one type selected from the group consisting of polymer compounds, coal-based pitch, petroleum-based pitch, mesophase pitch, coke, low-molecular-weight oil, and derivatives thereof.

(7) The production method for a composite active material for lithium secondary batteries according to any one of (4) to (6), wherein the graphite is expanded graphite.

(8) A lithium secondary battery comprising the composite active material for lithium secondary batteries described in any one of (1) to (3).

Advantageous Effects of Invention

The present invention can provide a composite active material for lithium secondary batteries capable of producing an electrode material in which volume expansion is suppressed even after repeated charging and discharging, and capable of producing a lithium secondary battery exhibiting excellent cycle characteristics, as well as a production method therefor.

Furthermore, the present invention can provide a battery that uses this composite active material for lithium secondary batteries.

DESCRIPTION OF EMBODIMENTS

The composite active material for lithium secondary batteries and production method therefor of the present invention will be described in detail below.

First, the features of the present invention compared to conventional art will be described in detail.

One feature of the production method of the present invention is that graphite having a prescribed specific surface area as well as silicon monoxide and a carbon precursor are used as starting raw materials of a composite active material for lithium secondary batteries. When the present inventors studied the cause of irreversible abnormal volume expansion occurring after repeated charging and discharging in battery materials that use the composite active material for lithium secondary batteries described in Patent Document 1, they found that silicon, which is a battery active material capable of combining with lithium ions, gradually oxides and becomes sponge-like. The cause of oxidation of the silicon is surmised to be a process which occurs repeatedly when lithium ions are accumulated in and released from the silicon, wherein stress is applied to the silicon and cracking occurs, and electrolyte permeates in from these cracks when volume expansion and contraction occur. Thus, the present inventors discovered that the above problems can be solved by using silicon monoxide as a starting raw material. More specifically, a spherical mixture in which silicon monoxide is encapsulated in a graphite component is obtained by performing a mixing step and conglobation treatment to be described later using silicon monoxide. When this mixture is heat-treated, the following reaction proceeds, and a composite containing silicon dioxide ($SiO_2$) and silicon (Si) (silicon-containing composite) is obtained.

$$2SiO \rightarrow Si + SiO_2$$

The obtained composite has the characteristic that stress does not tend to be applied to the silicon because the silicon consists of fine crystals (preferably not greater than 100 nm), and cracking does not tend to occur even with repeated expansion and contraction. Therefore, oxidation by the electrolyte occurs only on the surface, and advancement of oxidation by the electrolyte into the interior is averted. Furthermore, the majority of the fine silicon surface obtained in the mode described above is protected by silicon dioxide, and oxidation by the electrolyte as described above tends not to occur; this is also considered to result in a contribution to suppression of volume expansion of the electrode materials.

Additionally, the carbon precursor used in conjunction functions as an adhesive between the graphite component and the aforementioned composite, and has the function in aiding electrical contact between the two. As a result, the cycle characteristics of the lithium secondary battery are further improved.

Below, first, the production method for the composite active material for lithium secondary batteries of the present invention (also referred to simply as "composite active material" hereinafter) will be described in detail, and after that, modes of the produced composite active material for lithium secondary batteries will be described in detail.

The production method for composite active material for lithium secondary batteries of the present invention has a mixing step of mixing prescribed components; a conglobation step of performing conglobation treatment on the obtained mixture; and a heating step of heat-treating the obtained spherical mixture.

The materials used and the procedure for each of the steps will be described in detail below.

<Mixing Step>

The mixing step is a step in which graphite having a specific surface area of not less than 30 m²/g, silicon monoxide, and a carbon precursor are mixed to obtain a mixture. By performing this step, a mixture in which silicon monoxide is uniformly blended across an extremely large graphite surface and silicon monoxide is dispersed to an extremely high degree can be obtained. Furthermore, the carbon precursor serves the purpose of aiding adhesion between the graphite and the silicon monoxide at that time. Additionally, as will be described later, since the graphite has a large surface area, the silicon monoxide and carbon precursor dispersed on and attached to the graphite surface in the mixture becomes enveloped (in other words, encapsulated) in the graphite in a form where it is sandwiched by the graphite, simply by slight pressure being applied to the graphite.

First, the materials used in this step (graphite, silicon monoxide, carbon precursor, and the like) will be described in detail, and then the procedure of this step will be described in detail.

(Graphite)

The graphite used in this step has a specific surface area of not less than 30 m²/g. As long as it is within this range, a composite active material for lithium secondary batteries in which silicon is highly dispersed on the graphite surface having high surface area (and preferably thin) is obtained. As a result, the battery material that uses the composite active material for lithium secondary batteries of the present invention exhibits excellent battery characteristics (for example, high-speed charging and discharging characteristics, large charging and discharging capacity, good cycle characteristics, and the like). Above all, the specific surface area is preferably not less than 40 m²/g and more preferably not less than 60 m²/g because the cycle characteristics of a lithium secondary battery that uses the composite active material are better. The upper limit is not particularly limited, but the specific surface area is preferably not greater than 200 m²/g because otherwise, the production procedure becomes complex and synthesis is difficult.

When the specific surface area of the graphite is less than 30 m²/g, the mixture of graphite and silicon monoxide becomes non-uniform, and the silicon monoxide sloughs off during molding and the composite is exposed on the molded composite surface. As a result, volume expansion of the battery material containing the composite material becomes large and the cycle characteristics of a lithium secondary battery that uses the composite active material become poor.

The specific surface area of graphite is measured using the BET method by nitrogen adsorption (JIS Z 8830, single-point method).

The graphite contains layers consisting of multiple graphene sheets stacked in the direction in which the graphite planes are stacked, and the graphene sheets are bonded to each other primarily by van der Waals forces.

The average thickness of the layer of laminated graphene sheets contained in the graphite having the above prescribed specific surface area is preferably not greater than 29 nm and more preferably not greater than 22 nm, because the charging and discharging quantity and the cycle characteristics of a lithium secondary battery that uses the composite active material are better. The lower limit is not particularly limited but is normally not less than 4.4 nm in many cases because otherwise, the production procedure becomes complex.

As the method for measuring the aforementioned average thickness, the graphite is observed by electron microscope (TEM) and the thickness of the laminated graphene sheet layer in the graphite is measured at not less than 10 locations, and the average thickness is obtained by taking the arithmetic mean of those values.

The upper limit of bulk specific gravity of the graphite used is not particularly limited but is preferably not greater than 0.02 g/cm$^3$ and more preferably not greater than 0.01 g/cm$^3$ because the composite is more uniform and more highly dispersed in the graphite component in the composite active material. Due to problems in production, the lower limit is often not less than 0.005 g/cm$^3$.

As the method for measuring bulk specific gravity, a sample is inserted in a 500-mL glass graduated cylinder so as not to compress it, and bulk specific gravity is determined by dividing the sample weight by the sample volume.

As the graphite used in this step, a commercially available product may be used or graphite may be produced by a known method.

So-called expanded graphite or flake graphite may be used as this graphite.

Expanded graphite may be produced by, for example, soaking graphite (for example, scaly graphite) in an acid at room temperature and then heat-treating (for example, treating at 700 to 1000° C.) the obtained acid-treated graphite. More specifically, scaly natural graphite is soaked for approximately 1 hour in a mixed acid of 9 parts by weight of sulfuric acid and 1 part by weight of nitric acid, and then the acid is removed and the resultant graphite is washed and dried. The obtained acid-treated graphite is then put into a furnace at approximately 850° C. to obtain expanded graphite. Expanded graphite may also be obtained when graphite that has formed an intercalation compound of graphite and an alkali metal or the like is used.

The bulk density of the acid-treated graphite obtained as described above is not particularly limited but is preferably not less than 0.6 g/cm$^3$ and more preferably not less than 0.7 g/cm$^3$ because the acid-treated graphite expands sufficiently. The upper limit is not particularly limited but is often not greater than 1.0 g/cm$^3$ due to problems in production otherwise.

As the method for measuring bulk density, a sample is inserted in a 100-mL glass graduated cylinder so as not to compress it, and bulk density is determined by dividing the sample weight by the sample volume.

Furthermore, as the method for producing flake graphite, the above expanded graphite is dispersed in a solvent, and by treating it with ultrasonic treatment or a crusher that applies high shear stress (for example, a millstone), the hinge parts of the expanded graphite are destroyed and flake graphite in which approximately 50 graphene sheets (preferably from 10 to 150 sheets) are laminated is obtained.

Note that the number of graphene sheets that constitute the expanded graphite exhibiting the above specific surface area and the number of graphene sheets that constitute the flake graphite obtained by shredding it are basically presumed to be substantially the same.

(Silicon Monoxide)

The silicon monoxide used in this step functions as a precursor that produces silicon, which is the battery active material capable of combining with lithium ions. More specifically, a composite (silicon-containing composite) of silicon (Si) and silicon dioxide ($SiO_2$) is obtained by heat-treating a spherical mixture containing silicon monoxide in the heating step to be described later.

SiO ($0.8 \leq x \leq 1.5$) is preferably used as the silicon monoxide. The use of SiO ($x \approx 1$) is particularly desirable because the quantitative relationship between silicon and silicon dioxide is the preferred ratio.

The shape of the silicon monoxide used is not particularly limited, and any shape such as powder, plates, granules, fibers, lumps, and spheres may be used.

The average particle size of the silicon monoxide used is preferably not greater than 1 μm, more preferably not greater than 0.5 μm, and even more preferably not greater than 0.3 μm because sloughing off of silicon monoxide when forming the composite with graphite as well as expansion and destruction of silicon accompanying cycling can be further suppressed and because there are a greater number of electrical contact points with the graphite. The lower limit is not particularly limited and is preferably low, but is normally not less than 0.1 μm in many cases.

Laser diffraction-style particle size distribution measurement equipment is used to measure average particle size. More specifically, D50 (50% volume particle diameter) is used as the average particle size.

Furthermore, silicon monoxide particles of the above prescribed small particle size may be obtained by crushing silicon monoxide using a known apparatus such as a mixing tank-type agitation mill (bead mill or the like).

(Carbon Precursor)

The carbon precursor used in this step functions as an adhesive that increases adhesion between the graphite and the silicon monoxide in the mixture. When the heat treatment is performed by the heating step to be described later, the carbon precursor is converted to a carbide (for example, hard carbon, soft carbon, non-crystalline carbon, or the like).

The carbon precursor is not particularly limited as long as it is a material that is converted to a carbide by heat treatment (baking carbonization) as described above. Examples include polymer compounds (organic polymers), coal-based pitch, petroleum-based pitch, mesophase pitch, coke, low-molecular-weight oil, derivatives thereof, and the like. Above all, polymer compounds are preferred because expansion of a battery material that uses the composite active material for lithium secondary batteries is further suppressed and the cycle characteristics for lithium secondary batteries of such a material are better (also stated simply as "because the effects of the present invention are better" hereinafter).

Examples of the polymer compound include phenol resin, furan resin, epoxy resin, polyvinyl chloride, polyvinyl alcohol, polyacrylamide, polyethyleneimine, cellulose, rayon, polyacrylonitrile, polystyrene, and the like.

One type of carbon precursor may be used alone or two or more types may be used in combination.

The shape of the carbon precursor used is not particularly limited, and any shape such as powder, plates, granules, fibers, lumps, and spheres may be used. These carbon precursors are preferably dissolved in the solvent used when mixing the silicone monoxide and the expanded graphite.

The average molecular weight of the carbon precursor used is preferably not less than 1000 and more preferably not greater than 1,000,000 because the effects of the present invention are better.

(Procedures of Steps)

The method for mixing the above-described graphite, silicon monoxide, and carbon precursor is not particularly limited, and known methods such as so-called dry processes, wet processes, or the like may be used. Wet processes are preferred because the graphite, silicon monoxide, and carbon precursor in the obtained mixture are more uniformly mixed.

An example of a dry process is to add the above-described graphite, silicon monoxide, and carbon precursor and mix them in a known stirring device (for example, a Henschel mixer).

An example of a wet process is to disperse the above-described graphite, silicon monoxide, and carbon precursor in a solvent, stir and mix the obtained solution, and remove the solvent.

The type of solvent used in wet processes is not particularly limited, and should be a solvent that can disperse graphite, silicon monoxide, and carbon precursor. Examples include alcohol-based solvents (for example, methanol, ethanol, isopropanol), ketone-based solvents (for example, acetone, methyl ethyl ketone, cyclohexane), amide-based solvents (for example, formamide, dimethylacetamide, N-methylpyrrolidone, N-ethylpyrrolidone), nitrile-based solvents (for example, acetonitrile, propionitrile), ester-based solvents (for example, methyl acetate, ethyl acetate), carbonate-based solvents (for example, dimethyl carbonate, diethyl carbonate), ether-based solvents (for example, cellosolve), halogen-based solvents, water, mixtures thereof, and the like.

Above all, an alcohol-based solvent is preferred because the cycle characteristics of a lithium secondary battery that uses the obtained composite active material for lithium secondary batteries are better.

In wet processes, the conditions of mixing and stirring the graphite, silicon monoxide, and carbon precursor are not particularly limited, and optimal conditions are selected as appropriate according to the materials used. Normally, the stirring time is preferably approximately 1 to 2 hours because the graphite, silicon monoxide, and carbon precursor can be more uniformly dispersed, and as a result, the cycle characteristics of a lithium secondary battery that uses the obtained composite active material for lithium secondary batteries are better.

Furthermore, ultrasonic waves may be applied as necessary while stirring. In this case, the stirring time should be approximately 10 minutes.

The method for removing the solvent is not particularly limited, and a method using a known apparatus (for example, an evaporator) or the like may be employed.

The mixing ratio of graphite and silicon monoxide is not particularly limited, but is preferably from 10 to 230 parts by mass and more preferably from 20 to 200 parts by mass of silicon monoxide relative to 100 parts by mass of graphite because the effects of the present invention are better.

The mixing ratio of graphite and carbon precursor is not particularly limited, but is preferably from 1 to 50 parts by mass and more preferably from 5 to 20 parts by mass of carbon precursor relative to 100 parts by mass of graphite because the effects of the present invention are better.

The mixing ratio of silicon monoxide and carbon precursor is not particularly limited, but is preferably from 0.1 to 100 parts by mass and more preferably from 1 to 50 parts by mass of carbon precursor relative to 100 parts by mass of silicon monoxide because the effects of the present invention are better.

When a solvent is used, the used amount thereof is not particularly limited, but since the effects of the present invention are better as a result of a higher degree of dispersion, it is preferably from 3000 to 15,000 parts by mass and more preferably from 5000 to 7000 parts by mass of solvent relative to 100 parts by mass of graphite.

Note that before the below-described conglobation step of the above-described mixing step, a pressing step of pressing the obtained mixture may be included as necessary. When a pressing step is performed, the distance between graphite particles is smaller and the conglobation treatment proceeds more efficiently.

The method of pressing is not particularly limited, and a known method may be employed.

<Conglobation Step>

The conglobation step is a step in which conglobation treatment is performed on the mixture containing graphite, silicon monoxide, and a carbon precursor obtained in the above mixing step, to produce a spherical mixture.

By implementing this step, the graphite sheets are folded and conglobated so as to incorporate the silicon monoxide and carbon precursor inside them. At that time, a structure is obtained in which the edge parts of the graphite are folded to the inside and substantially no silicon monoxide is exposed on the surface of the composite active material for lithium secondary batteries.

The differences in the mechanism in the conglobation step in the case where scaly graphite with specific surface area of less than 30 $m^2/g$ is used and the case where graphite having a large specific surface area (expanded graphite or flake graphite) is used will be described in detail. Note that both silicon monoxide and carbon precursor are called "precursor material" below.

For example, as described in Japanese Unexamined Patent Application Publication No. 2008-27897A, when scaly graphite having a specific surface area of less than 30 $m^2/g$ and precursor material are placed in high-speed airflow, the long axis direction—that is, the AB plane—of the graphite aligns in the direction of the airflow and collides with pins or collision plates placed perpendicular to the airflow, or the particles of the graphite-precursor material mixture collide with each other, and the AB plane of the graphite is compressed and deformed and consequently undergoes conglobation in a form where it sandwiches the precursor material. In this case, much of the precursor material present at the graphite surface separates from the graphite surface due to the impact of collision, and only the precursor material that happens to have been sandwiched between AB planes of the graphite is sandwiched between graphite layers.

In the present invention, on the other hand, when expanded graphite, for example, is used as the graphite having a large specific surface area, the long axis of expanded graphite is the C axis direction of the graphite, and when the graphite is placed in high-speed airflow, the C axis of the graphite aligns in the direction of the airflow and collides with the pins or collision plates, or the particles collide with each other. As a result, first, the C axis of the graphite is compressed and the graphite is changed to a state close to its pre-expansion form. This means that the precursor material attached to the AB plane of the graphite is crushed by the graphite and completely sandwiched by the graphite layers. The graphite compressed in the C axis direction changes to a structure in which the AB plane serves as the long axis, and eventually the AB plane of the graphite changes to a folded spherical body.

Furthermore, in the case of flake graphite, it simultaneously incurs compression in the direction parallel to and compression in the direction perpendicular to the AB plane of the graphite, but since the elastic modulus of the graphite AB plane is low, the precursor material readily adheres and is deformed between AB planes of the graphite due to the compression in the direction perpendicular to the AB plane, and the action of the precursor material attached to the flake graphite surface sandwiched in the graphite AB planes takes precedence. After that, deformation of the graphite AB plane having a high elastic modulus occurs, and conglobation proceeds.

Needless to say, since the laminated graphene sheet layers that constitute expanded graphite or flake graphite are thin, the AB plane is easily deformed by a smaller compressive force in the direction of the AB plane.

The method of conglobation treatment is not particularly limited as long as a crusher that can mainly apply impact stress is used. Examples of the crusher include a high-speed rotary impact crusher, and more specifically, a sample mill, hammer mill, pin mill, or the like may be used. Above all, a pin mill is preferred because mixing of the graphite and the precursor material is more uniform and the effects of the present invention are better.

The high-speed rotary impact crusher may be one that causes a sample to collide with a rotor which rotates at high speed and crushes it into fine particles using the impact force thereof. Examples include a hammer type of hammer mill in which a stationary-style or swinging-style impactor is mounted on a rotor, a rotating disk type of pin mill in which pins or collision heads are mounted on rotating disks, an axial flow type which crushes the sample while it is fed in the direction of the shaft, and an annular type which makes particles fine using narrow ring-shaped parts. More specific examples include a hammer mill, pin mill, screen mill, turbo mill, centrifugal classifier-type mill, and the like.

Furthermore, when this step is performed using a high-speed rotary impact crusher, conglobation is performed at a rotation speed of normally not less than 100 rpm, preferably not less than 1500 rpm, and normally not greater than 20,000 rpm. Therefore, the collision speed is preferably approximately from 20 m/sec to 100 m/sec.

As conglobation treatment is performed with low impact force, unlike crushing, circulating treatment is preferably performed in this step. The treatment time varies depending on the type of crusher used and the quantity loaded, but normally it is 2 minutes or less, and treatment is completed in approximately 10 seconds as long as it is an apparatus in which appropriate pins or collision plates are arranged.

Furthermore, conglobation treatment is preferably performed in air. When this treatment is performed under nitrogen flow, there is danger of ignition when opened to the atmosphere.

The size of the spherical mixture obtained by the above conglobation treatment is not particularly limited, but the particle size of the spherical mixture (D50: 50% volume particle diameter) is preferably from 2 to 40 µm, more preferably from 5 to 35 µm, and even more preferably from 5 to 30 µm, because the effects of the present invention are better.

D50 corresponds to the 50% cumulative particle diameter from the fine side of the cumulative particle size distribution measured by the laser diffraction/scattering measurement method.

Note that when measurement is performed, the spherical mixture is added to a liquid and mixed vigorously while using ultrasonic waves or the like, and the produced dispersion is introduced into the apparatus as a sample and measured. As the liquid, water, alcohol, or a low-volatility organic solvent is preferred due to ease of handling. It is preferred that the obtained particle size distribution be a normal distribution at that time.

(Heating Step)

The heating step is a step of heat-treating the spherical mixture obtained as described above and producing a substantially spherical composite active material for lithium secondary batteries (composite active material). The composite active material contains a graphite component derived from the aforementioned graphite and a composite containing silicon and silicon dioxide (silicon-containing composite), and the composite is encapsulated in the graphite component as will be described later. Furthermore, as long as the composite contains silicon and silicon dioxide, the state of dispersion of the two is not particularly limited, and may be, for example, a sea-and-island state of dispersion. Above all, it is preferably a composite in which silicon is dispersed in silicon dioxide because the effects of the present invention are better. Furthermore, some of the precursor silicon monoxide sometimes may remain in the composite.

As heat treatment conditions, the heating temperature is preferably not less than 700° C. and more preferably not less than 800° C. because the effects of the present invention are better. The upper limit is not particularly limited but is preferably not greater than 2000° C., more preferably not greater than 1500° C., and even more preferably not greater than 1000° C.

The heating time is preferably not less than 0.5 hours and more preferably not less than 1 hour. The upper limit is not particularly limited but is often not greater than 5 hours because the effects of the present invention become saturated and because fine crystals of silicon are of a preferred size.

The atmosphere in which heat treatment is performed is preferably an inert atmosphere because it prevents oxidation of silicon and carbon.

<Composite Active Material for Lithium Secondary Batteries>

Figure 1:
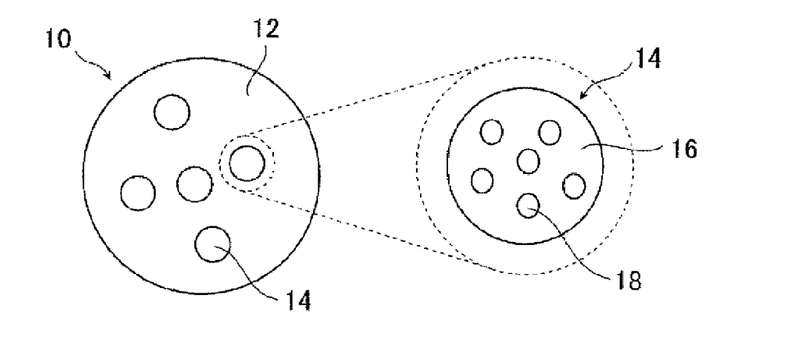
FIG. 1 is a schematic cross-sectional view of an embodiment of the composite active material for lithium secondary batteries of the present invention.

The composite active material for lithium secondary batteries obtained via the steps described above is substantially spherical and contains a graphite component and a composite. FIG. 1 is a schematic view of an embodiment of a composite active material. As illustrated in FIG. 1, a composite active material 10 is substantially spherical, and as the structure thereof, a composite 14 is encapsulated in a graphite component 12, and in the composite 14, silicon 18 is dispersed in silicon dioxide 16. Note that a composite in which silicon is dispersed in silicon dioxide is described above, but it is not limited to this mode.

The obtained composite active material will be described in detail below.

The shape of the composite active material is substantially spherical because of the treatment described above. Substantially spherical means that the composite active material has a structure having roundness and is a shape that does not have sharp edges (peaks and jutting parts) as are generally seen in fractured particles.

More specifically, substantially spherical indicates a shape of composite active material in which the aspect ratio, which is the ratio of the long diameter to the short diameter (long diameter/short diameter) is approximately in the range of 1 to 3 (more preferably 1 to 2 because the effects of the present invention are better). The aspect ratio signifies the arithmetic mean of the values of long diameter/short diameter of at least 100 particles.

The short diameter in the above description is the distance between the two parallel lines that result in the shortest distance among the combinations of two parallel lines touching the outside of and sandwiching a particle observed by scanning electron microscope. On the other hand, the long diameter is the distance between the two parallel lines that result in the longest distance among the combinations of two parallel lines touching the outside of a particle and orthogonal to the parallel lines that determine the short diameter. The rectangle formed by these four lines has a size that the particle just fits into.

The area ratio of the graphite component exposed on the composite active material surface observed by scanning electron microscope (SEM) at acceleration voltage of not greater than 10 kV is not less than 95%. Above all, not less than 98% is more preferred, and not less than 99% is even more preferred. The upper limit is not particularly limited, and may be 100%. As long as the area ratio is within the above range, the amount of composite exposed on the surface of the composite active material is small, and as a result, volume expansion of an electrode material that contains the composite active material is suppressed and a lithium secondary battery that contains the composite active material exhibits excellent cycle characteristics.

If the above area ratio is outside the above range (less than 95%), the composite readily sloughs off and cycle characteristics are inferior, or volume expansion of an electrode material containing the composite is large.

As the method for measuring the area ratio, at least 100 particles of composite active material are observed by scanning electron microscope (SEM) at acceleration voltage of not greater than 10 kV (preferably at a magnification of not less than 2000×), and the area ratio of the graphite component relative to the surface of each composite active material particle is measured, and the arithmetic mean thereof is taken as the area ratio.

The area ratio of the composite exposed on the composite active material surface observed by scanning electron microscope (SEM) at acceleration voltage of not greater than 10 kV is preferably not greater than 5%. Above all, not greater than 2% is more preferred, and not greater than 1% is even more preferred. The lower limit is not particularly limited, and may be 0%. As long as the area ratio is within the above range, the amount of composite exposed on the surface of the composite active material is small, and as a result, volume expansion on an electrode material that contains the composite active material is suppressed and a lithium secondary battery that contains the composite active material exhibits excellent cycle characteristics.

As the method for measuring the area ratio, at least 100 particles of composite active material are observed by scanning electron microscope (SEM) at acceleration voltage of not greater than 10 kV (preferably at magnification of not less than 2000×), and the area ratio of the composite relative to the surface of each composite active material particle is measured, and the arithmetic mean thereof is taken as the area ratio.

Furthermore, a feature of the composite active material for lithium secondary batteries is that when observed by scanning electron microscope (SEM) at acceleration voltage of not greater than 10 kV, the composite that has penetrated through the thin graphite layer and has been encapsulated in a state sandwiched in graphite layers can be observed directly.

A preferred mode of the composite active material is a mode in which substantially no edge parts of the graphite are exposed on the surface thereof. Due to no edge parts being exposed on the surface, degradation of the electrolyte and destruction of the graphite, which readily occur during the charge-discharge cycle, are suppressed, resulting in improved cycle characteristics.

The graphite component in the composite active material is the graphite-derived component described above. Note that because conglobation treatment is performed at the time of formation of the composite active material, the above-described graphite may also take on a folded structure in the composite active material.

The content of the composite in the composite active material may be adjusted as appropriate according to the content of silicon monoxide in the mixing step described above.

Above all, the content of the composite is preferably not less than 10 mass %, more preferably 20 mass %, and particularly preferably not less than 30 mass % relative to the total amount of composite active material because the effects of the present invention are better. The upper limit is preferably not greater than 80 mass % and more preferably not greater than 70 mass %.

In the obtained composite active material, the area ratio of the graphite component exposed on the composite active material surface is within the above range even when the content of the composite is within the above range.

The shape of the composite in the composite active material is not particularly limited, but is normally substantially spherical in many cases. The composite active material may also contain a large number of composite particles, as illustrated in FIG. 1.

The average particle size of the composite in the composite active material is not particularly limited but is preferably not greater than 1 μm, more preferably not greater than 0.5 μm, and even more preferably not greater than 0.3 μm because the effects of the present invention are better. The lower limit is not particularly limited and is preferably low (not less than 50 nm in many cases).

As the method for measuring the average particle size, a cross-section of the composite active material is observed by electron microscope and the diameter of at least 10 composite particles is measured, and the arithmetic mean thereof is taken as the average particle size. Note that when the composite does not have a perfectly circular shape, the circular equivalent diameter is used. The "circular equivalent diameter" is the diameter of a circle having the same projected area as the projected area of the composite when it is assumed that the shape of the observed composite is that circle.

As described above, the composite contains silicon and silicon dioxide, and the silicon is preferably encapsulated in the silicon dioxide. The composite may also contain a large number of silicon particles, as illustrated in FIG. 1.

The average particle size of silicon in the composite is not particularly limited but is preferably from 1 to 100 nm and more preferably from 1 to 20 nm because the effects of the present invention are better.

As the method for measuring the average particle size, a cross-section of the composite active material is observed by electron microscope (TEM) and the diameter of at least 10 silicon particles is measured, and the arithmetic mean thereof is taken as the average particle size. Note that when the silicon does not have a perfectly circular shape, the circular equivalent diameter is used. The "circular equivalent diameter" is the diameter of a circle having the same projected area as the projected area of the silicon when it is assumed that the shape of the observed silicon is that circle.

The content of silicon in the composite is not particularly limited but is preferably from 20 to 200 mass % and more preferably from 40 to 150 mass % relative to the total mass of silicon dioxide in the composite because the effects of the present invention are better.

Note that some of the silicon dioxide ($SiO_2$) in the composite may be removed as necessary using HF or the like. At that time, the amount of silicon dioxide on the silicon (Si) surface can be adjusted by varying the amount of etching. From the perspective of protecting the surface, it is preferable to leave a certain amount of silicon dioxide. By removing silicon dioxide, the relative mass of Si which is the active material can be increased and capacity can be increased. Furthermore, if necessary, the voids left after silicon dioxide has been removed can be decreased using an apparatus that isotropically applies force, such as a mill used in conglobation.

As described above, the content of silicon may be increased by eluting $SiO_2$ with HF, and in that case, the content of silicon may be adjusted to 100 to 9900 mass % relative to the total mass of silicon dioxide in the composite.

The content of silicon may be measured by ICP emission spectroscopy.

The composite active material normally contains a carbide derived from a carbon precursor (carbon material; for example, hard carbon, soft carbon, or the like).

The content of the carbide in the composite active material may be adjusted as appropriate according to the content of carbon precursor in the mixing step described above.

Above all, the carbide content is preferably not less than 1 mass %, more preferably not less than 2 mass %, and particularly preferably not less than 5 mass % relative to the total amount of composite active material because the effects of the present invention are better. The upper limit is preferably not greater than 30 mass % and more preferably not greater than 20 mass %.

The particle diameter (D50: 50% volume diameter) of the composite active material is not particularly limited but is preferably from 2 to 40 μm, more preferably from 5 to 35 μm, and even more preferably from 5 to 30 μm because the effects of the present invention are better.

Furthermore, the particle diameter (D90: 90% volume diameter) is not particularly limited but is preferably from 10 to 60 μm and more preferably from 20 to 45 μm because the effects of the present invention are better.

Additionally, the particle diameter (D10: 10% volume diameter) is not particularly limited but is preferably from 1 to 20 μm and more preferably from 2 to 10 μm because the effects of the present invention are better.

D10, D50, and D90 correspond to the 10%, 50%, and 90% cumulative particle diameter from the fine side of the cumulative particle size distribution measured by the laser diffraction/scattering measurement method.

Note that when measurement is performed, the composite active material is added to a liquid and mixed vigorously while using ultrasonic waves or the like, and the produced dispersion is introduced into the apparatus as a sample and measured. As the liquid, water, alcohol, or a low-volatility organic solvent is preferred due to ease of handling. It is preferred that the obtained particle size distribution be a normal distribution at that time.

The bulk density of the composite active material is not particularly limited but is preferably not less than 0.5 $g/cm^3$ and more preferably not less than 0.7 $g/cm^3$ because the capacity per volume of obtained composite active material is larger. The upper limit is not particularly limited.

The method for measuring bulk density is the same as the method for measuring the bulk density of graphite described above except that a 25-mL graduated cylinder is used.

The tap density of the composite active material is not particularly limited but is preferably not less than 0.8 $g/cm^3$ and more preferably not less than 1.0 $g/cm^3$ because the capacity per volume of obtained composite active material is larger. The upper limit is not particularly limited, but not greater than 1.6 $g/cm^3$ is preferred.

As the method for measuring tap density, a sample is inserted in a 25-mL graduated cylinder, it is tapped, and tap density is determined by dividing the sample weight by the sample volume at the point when there is no longer any change in volume.

The specific surface area (BET specific surface area) of the composite active material is not particularly limited but is preferably not less than 5 $m^2/g$ and more preferably not less than 8 $m^2/g$ because the cycle characteristics of a lithium secondary battery that uses the obtained composite active material are better. The upper limit is not particularly limited, but not greater than 100 $m^2/g$ is preferred.

As the method for measuring the specific surface area (BET specific surface area) of the composite active material, the sample is measured by the nitrogen adsorption single-point method after vacuum-drying for 30 minutes at 300° C.

The surface of the composite active material may be covered with carbon as necessary. By implementing such treatment, the surface area of the composite active material may be adjusted and electrochemical stability may be increased.

The method for covering with carbon is not particularly limited but may be CVD, for example. More specifically, it is preferable to perform CVD treatment at 750 to 1100° C. under the flow of a gas such as toluene.

<Lithium Secondary Battery>

The composite active material described above is useful as an active material used in battery materials (electrode materials) used in lithium secondary batteries.

Features of battery materials that use the above composite active material are that capacity is close to the theoretical value of the battery material and that expansion is suppressed. Furthermore, a battery that uses this battery material exhibits excellent cycle characteristics. Additionally, ultra-fast charging and discharging characteristics are excellent because the diffusion length of Li ions is small as a result of silicon having been made into fine particles.

Note that the above composite active material is preferably used in the anode. A mode using the composite active material in an anode will be described in detail below.

The method for producing an anode for lithium secondary batteries using the composite active material is not particularly limited, and a known method may be used.

For example, an anode for lithium secondary batteries may be produced by mixing the composite active material and a binder, making it into a paste using compression molding or a solvent, and applying it to copper foil. More specifically, 92 g of composite active material, 62 g of 13% PVDF/NMP solution, 0.5 g of conductive carbon black, and 29 g of NMP are mixed, and a good slurry is obtained using a typical dual arm mixer.

Aside from copper foil, a material having a three-dimensional structure may also be used as a current collector because the cycle characteristics of the battery are better. Examples of materials of a current collector having a three-dimensional structure include carbon fibers, sponge-like carbon (carbon applied to sponge-like resin), metals, and the like.

Examples of a current collector (porous current collector) having a three-dimensional structure include, as porous bodies of metal or carbon current collectors, plain weave metal mesh, expanded metal, lath mesh, metal foam, metal fabric, metal non-woven fabric, carbon fiber fabric, carbon fiber non-woven fabric, and the like.

The binder used may be a known material, examples of which include fluorine resins such as polyvinylidene fluoride and polytetrafluoroethylene, SBR, polyethylene, polyvinyl alcohol, carboxymethylcellulose, glue, and the like.

Examples of the solvent include water, isopropyl alcohol, N-methylpyrrolidone, dimethylformamide, and the like.

Note that when making the paste, stirring and mixing may be performed using a known stirrer, blender, mixer, kneader, or the like according to need, as described above.

When preparing the coating slurry using the composite active material, it is preferable to add conductive carbon black, carbon nanotubes, or a mixture thereof as a conductive material. The shape of the composite active material obtained by the above steps is often relatively particulate (especially substantially spherical), and contact between particles tends to be point contact. To avoid damage, methods in which carbon black, carbon nanotubes, or a mixture thereof is blended in the slurry may be employed. Carbon black, carbon nanotubes, or a mixture thereof can prevent the disconnection of contact points (increased resistance) which accompanies cycling because they aggregate in a concentrated manner in the capillary portions formed by contact with the composite active material when the slurry solvent is dried.

The blended amount of carbon black, carbon nanotubes, or a mixture thereof is not particularly limited but is preferably from 0.2 to 4 part by mass and more preferably from 0.5 to 2 parts by mass relative to 100 parts by mass of composite active material. Examples of carbon nanotubes include single-wall carbon nanotubes and multi-wall carbon nanotubes.

(Cathode)

Cathodes that use known cathode materials may be used as the cathode used in a lithium secondary battery having an anode obtained using the above composite active material.

As the method for producing the cathode, known methods may be employed, such as coating the surface of a current collector with a cathode compound made of a cathode material, a binder, and a conductive agent. Examples of the cathode material (cathode active material) include metal oxides such as chromium oxide, titanium oxide, cobalt oxide, and vanadium pentoxide; lithium metal oxides such as $LiCoO_2$, $LiNiO_2$, $LiNi_{1-y}Co_yO_2$, $LiNi_{1-x-y}Co_xAl_yO_2$, $LiMnO_2$, $LiMn_2O_4$, and $LiFeO_2$; transition metal chalcogen compounds such as titanium sulfide and molybdenum sulfide; and conductive conjugated polymer materials such as polyacetylene, polyparaphenylene, and polypyrrole.

(Electrolyte)

Known electrolytes may be used as the electrolyte used in a lithium secondary battery having an anode obtained using the above composite active material.

Examples of electrolyte salts that may be contained in the electrolyte include lithium salts such as $LiPF_6$, $LiBF_4$, $LiAsF_6$, $LiClO_4$, $LiB(C_6H_5)$, $LiCl$, $LiBr$, $LiCF_3SO_3$, $LiCH_3SO_3$, $LiN(CF_3SO_2)_2$, $LiC(CF_3SO_2)_3$, $LiN(CF_3CH_2OSO_2)_2$, $LiN(CF_3CF_2OSO_2)_2$, $LiN(HCF_2CF_2CH_2OSO_2)_2$, $LiN\{(CF_3)_2CHOSO_2\}_2$, $LiB\{(C_6H_3(CF_3)_2\}_4$, $LiN(SO_2CF_3)_2$, $LiC(SO_2CF_3)_3$, $LiAlCl_4$, and $LiSiF_6$. $LiPF_6$ and $LiBF_4$ are particularly preferred from the perspective of oxidation stability.

The electrolyte salt concentration in the electrolyte solution is preferably from 0.1 to 5 mol/L and more preferably from 0.5 to 3 mol/L.

Examples of the solvent used in the electrolyte include carbonates such as ethylene carbonate, propylene carbonate, dimethyl carbonate, and diethyl carbonate; ethers such as 1,1- or 1,2-dimethoxyethane, 1,2-diethoxyethane, tetrahydrofuran, 2-methyltetrahydrofuran, γ-butyrolactone, 1,3-dioxofuran, 4-methyl-1,3-dioxolane, anisole, and diethyl ether; thioethers such as sulfolane and methylsulfolane; nitriles such as acetonitrile, chloronitrile, and propionitrile; and organic aprotic solvents such as trimethyl borate, tetramethyl silicate, nitromethane, dimethylformamide, N-methylpyrrolidone, ethyl acetate, trimethyl orthoformate, nitrobenzene, benzoyl chloride, benzoyl bromide, tetrahydrothiophene, dimethyl sulfoxide, 3-methyl-2-oxazoline, ethylene glycol, and dimethyl sulfite.

Additives such as fluoroethylene carbonate and the like may also be added to the electrolyte. These additives form a stable protective film on the silicon surface and are known to improve cycle characteristics.

Instead of an electrolyte solution, a polymer electrolyte such as polymer solid electrolyte or polymer gel electrolyte may also be used. As the polymer compound that constitutes a matrix of the polymer solid electrolyte or polymer gel electrolyte, ether-based polymer compounds such as polyethylene oxide or cross-linked compounds thereof; methacrylate-based polymer compounds such as polymethacrylate; acrylate-based polymer compounds such as polyacrylate; and fluorine-based polymer compounds such as polyvinylidene fluoride (PVDF) and vinylidene fluoride-hexafluoropropylene copolymer may be used. These may also be used as mixtures. From the perspective of oxidation-reduction stability, fluorine-based polymer compounds such as polyvinylidene fluoride (PVDF) and vinylidene fluoride-hexafluoropropylene copolymer are particularly preferred.

(Separator)

Known materials may be used as the separator used in a lithium secondary battery having an anode obtained using the above composite active material. Examples include fabric, non-woven fabric, synthetic microporous resin film, and the like. Synthetic microporous resin films are advantageous, among which polyolefin-based microporous films are advantageous from the perspectives of film thickness, film strength, film resistance, and the like. Specifically, examples include polyethylene and polypropylene microporous films, microporous films that are composites thereof, and the like.

A lithium secondary battery may have the form of a cylinder, a rectangle, or a button produced by customary methods using the above-described anode, cathode, separator, electrolyte, and other constituent elements of a battery (for example, the current collector, gasket, seal sheet, case, and the like).

The lithium secondary battery of the present invention may be used in various portable electronic devices, especially notebook PCs, notebook word processors, palmtop (pocket) PCs, cellular telephones, portable fax machines, portable printers, headphone stereos, video cameras, portable televisions, portable CD players, portable minidisc players, electric shavers, electronic organizers, transceivers, power tools, radios, tape recorders, digital cameras, portable copiers, portable game devices, and the like. Furthermore, it may also be used as a secondary battery for electric automobiles, hybrid automobiles, vending machines, electric carts, capacitor systems for load leveling, household capacitors, distributed power storage device systems (built into deferred operation products), emergency power supply systems, and the like.

EXAMPLES

Example 1

(Preparation of Expanded Graphite)

Scaly natural graphite having an average particle size of 1 mm was soaked for 1 hour in a mixed acid containing 9 parts by weight of sulfuric acid and 1 part by weight of nitric acid, and then the mixed acid was removed with a no. 3 glass filter, to obtain acid-treated graphite. The acid-treated graphite was then washed with water and dried. Then, 5 g of the dried acid-treated graphite was stirred in 100 g of distilled water, and when the pH was measured after 1 hour it was 6.7. The dried acid-treated graphite was put in a vertical electric furnace in a nitrogen atmosphere set to 850° C., to obtain expanded graphite. The bulk density of the acid-treated graphite was 0.78 g/cm$^3$. The specific surface area of the expanded graphite was 83 m$^2$/g, the bulk specific gravity was 0.011 g/cm$^3$, and the average thickness of the layer of laminated graphene sheets was 16 nm.

(Mixing Step)

An ethanol slurry of silicon monoxide (SiO) fine powder having an average particle size of 0.3 µm (solids concentration 26.6%, 22.56 parts by mass) was put in 1600 parts by mass of ethanol in a beaker, phenol resin (degree of carbonization 40%, 5 parts by mass) was added as a carbon precursor, and ultrasonic treatment was performed for 10 minutes while stirring.

The above expanded graphite (12 parts by mass) was added to ethanol in which SiO was dispersed, to prepare a uniformly mixed slurry containing expanded graphite, SiO fine powder, and phenol resin. The ethanol was recovered from the slurry using an evaporator, and a powder mixture was obtained.

(Pressing Step)

Pressing of the above powder mixture was performed using three rollers (EKAKT 50). The layer of expanded graphite opened by this treatment closes, the distance between layers shrinks, and density increases, and by increasing the collision energy in the subsequent conglobation step, conglobation efficiency can be increased.

(Conglobation Step)

The powder mixture obtained as described above was granulation-molded into a spherical shape using a New Power Mill PM-2005M-1380W (Osaka Chemical Co., Ltd.) (rotational speed: 20,000 rpm, treatment time: 90 seconds, performed 10 times).

(Firing, Carbonization Treatment, Si Fine Crystal Formation)

By heating the spherical mixture for 1 hour at 900° C. under nitrogen flow (1 L/min), carbonization of phenol resin and pyrolysis of SiO into silicon (Si) and silicon dioxide (SiO$_2$) were simultaneously performed. By so doing, a substantially spherical composite active material for lithium secondary batteries comprising 60 mass % of graphite, 30 mass % of composite containing silicon and silicon dioxide, and 10 mass % of phenol resin-derived hard carbon was obtained.

Its properties were as follows. Bulk density: 0.67 g/cm$^3$, tap density: 1.21 g/cm$^3$, particle diameter distribution D90: 43 µm, D50: 24 µm, D10: 5.7 µm, specific surface area: 8.7 m$^2$/g, shape: average aspect ratio: 1.55.

When a two-dimensional SEM (scanning electron microscope) photograph was taken at a low acceleration voltage of not greater than 10 kV, particles of composite in which silicon had penetrated the graphite skin and dispersed in silicon dioxide (also referred to as simply "composite" hereinafter) could be clearly seen.

From this fact it was directly observed that it was a structure in which the composite was sandwiched by thin graphite layers in the composite active material. Furthermore, it was simultaneously ascertained that there was extremely little composite exposed on the surface and that graphite edge faces were not present on the surface of the composite.

More specifically, the area ratio of graphite exposed on the surface of the composite active material for lithium secondary batteries observed by SEM was 98%, and the area ratio of exposed composite was 2%.

(Anode Structure)

92 parts by mass of the above composite active material, 62 parts by mass of polyvinylidene fluoride (PVDF)-containing NMP solution (content: 13 mass %), 0.5 parts by mass of conductive carbon black, and 29 parts by mass of NMP were weighed out, and a slurry for coating was prepared by mixing them for 3 minutes using a dual arm mixer. Copper foil was coated with this slurry and dried to produce an anode.

(Cathode Structure)

84 parts by mass of LiNi$_{1-x-y}$Co$_x$Al$_y$O$_2$, 66 parts by mass of polyvinylidene fluoride (PVDF)-containing NMP solution (content: 12 mass %), 8 parts by mass of conductive carbon black, and 29 parts by mass of NMP were weighed out, and a slurry for coating was prepared by mixing them for 3 minutes using a dual arm mixer. Aluminum foil was coated with this slurry and dried to produce a cathode.

(Full Cell Structure)

Using the above anode and cathode as the electrodes, a full cell was created by adding 1.2 mol/liter of LiPF$_6$ electrolyte having a ratio of ethylene carbonate:diethyl carbonate of 1:1, and 2 vol % fluoroethylene carbonate. The resultant battery was evaluated as follows.

(Battery Evaluation: Electrode Expansion Measurement)

A cycle test was conducted using the above full cell, and then the cell was disassembled and the electrodes removed, and the change in thickness of the electrodes {(electrode thickness after test−electrode thickness before test)/(electrode thickness before test)×100} was measured. Furthermore, a cycle experiment was conducted using a charging and discharging rate of C/3 (0.18 mA) with a cutoff voltage on the charging side of 4.2 V and a cutoff voltage on the discharging side of 3.0 V.

The shape of the electrode before the cycle test was a disc 14 mm in diameter of thickness 55 µm. The thickness was an average value, determined by measuring the thickness at the center of the disc and any other three points and taking the arithmetic mean thereof. The thickness of the electrodes after the cycle test was similarly determined by measuring the thickness at the center of the disc and any other three points and taking the arithmetic mean thereof.

In the cycle experiment, the capacity retention rate in the 11$^{th}$ cycle was measured based on the average discharge capacity (mAh) in the second cycle.

Furthermore, Coulombic efficiency in the 10$^{th}$ cycle was also measured.

Results are compiled in Table 1.

Comparative Example 1

Substantially spherical composite active material for lithium secondary batteries comprising 70 mass % of graphite and 30 mass % of metallic Si was obtained according to Example 1 of Patent Document 1 (Japanese Patent No. 5227483B).

Using the obtained composite active material, a full cell was produced and various evaluations performed according to the same procedure as Example 1.

TABLE 1

|  | Average discharge capacity (2$^{nd}$ cycle) | Average discharge capacity (11$^{th}$ cycle) | Capacity retention rate (%) | Coulombic efficiency (10$^{th}$ cycle) | Electrode expansion rate (10$^{th}$ cycle) |
|---|---|---|---|---|---|
| Example 1 | 1.79 | 1.77 | 98.8 | 99.30% | 13% |
| Comparative Example 1 | 2.34 | 2.04 | 87.1 | 98.50% | 35% |

As shown in Table 1 above, the full cell that used the composite active material for lithium secondary batteries of the present invention exhibited excellent capacity retention rate and Coulombic efficiency, and it was ascertained to have excellent cycle characteristics. It was also ascertained that expansion of the electrodes containing this composite active material was suppressed.

On the other hand, in Comparative Example 1 which is a mode of Patent Document 1, the cycle characteristics of the full cell were poor and electrode expansion was larger compared to the example above.

The present invention has been described in detail with reference to specific embodiments, but, it is obvious for a person skilled in the art that various changes and modifications are possible without departing from the intention and the scope of the present invention.

INDUSTRIAL APPLICABILITY

The composite active material according to the present invention may be used as an electrode material of a lithium secondary battery.

REFERENCE SIGNS LIST

10 Composite active material
12 Graphite component
14 Composite
16 Silicon dioxide
18 Silicon

The invention claimed is:

1. A composite active material for lithium secondary batteries comprising:
    a composite containing silicon and silicon dioxide; and
    a graphite component,
    wherein said composite is encapsulated in said graphite component,
    the content of the composite is 30 mass % to 80 mass % relative to the total amount of the composite active material, and
    an area ratio of the graphite component exposed on a surface observed by scanning electron microscope at acceleration voltage of not greater than 10 kV being not less than 95%, wherein as the method for measuring the area ratio, at least 100 particles of said composite are observed by scanning electron microscope (SEM) at acceleration voltage of not greater than 10 kV, and the area ratio of the graphite component relative to the surface of each composite active material particle is measured, and the arithmetic mean thereof is taken as the area ratio.

2. The composite active material for lithium secondary batteries according to claim 1, wherein an average particle size of the silicon is from 1 to 100 nm.

3. The composite active material for lithium secondary batteries according to claim 1, wherein an average particle size of the composite is from 50 to 1000 nm.

4. A production method for the composite active material for lithium secondary batteries described in claim 1, comprising:
    a mixing step of mixing graphite having a specific surface area of not less than 30 m$^2$/g, silicon monoxide, and a carbon precursor to obtain a mixture;
    a conglobation step of performing conglobation treatment on the mixture and obtaining a spherical mixture; and
    a heating step of heat-treating the spherical mixture and producing a substantially spherical composite active material for lithium secondary batteries.

5. The production method for a composite active material for lithium secondary batteries according to claim 4, wherein an average particle size of the silicon monoxide is not greater than 1 μm.

6. The production method for a composite active material for lithium secondary batteries according to claim 4, wherein
    the carbon precursor is at least one type selected from the group consisting of polymer compounds, coal-based pitch, petroleum-based pitch, mesophase pitch, coke, low-molecular-weight oil, and derivatives thereof.

7. The production method for a composite active material for lithium secondary batteries according to claim 4, wherein the graphite is expanded graphite.

8. A lithium secondary battery comprising the composite active material for lithium secondary batteries described in claim 1.

* * * * *